US010599644B2

(12) United States Patent
Braz et al.

(10) Patent No.: US 10,599,644 B2
(45) Date of Patent: Mar. 24, 2020

(54) SYSTEM AND METHOD FOR MANAGING ARTIFICIAL CONVERSATIONAL ENTITIES ENHANCED BY SOCIAL KNOWLEDGE

(71) Applicant: INTERNATIONAL BUSINESS MACHINES CORPORATION, Armonk, NY (US)

(72) Inventors: Alan Braz, Campinas (BR); Paulo Rodrigo Cavalin, Rio de Janeiro (BR); Flavio Vinicius Diniz de Figueiredo, Rio de Janeiro (BR); Maira Gatti De Bayser, Rio de Janeiro (BR); Renan Francisco Santos Souza, Rio de Janeiro (BR)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 725 days.

(21) Appl. No.: 15/265,615

(22) Filed: Sep. 14, 2016

(65) Prior Publication Data

US 2018/0075335 A1    Mar. 15, 2018

(51) Int. Cl.
G06F 16/2452 (2019.01)
G06F 16/332 (2019.01)

(52) U.S. Cl.
CPC .... G06F 16/24522 (2019.01); G06F 16/3329 (2019.01)

(58) Field of Classification Search
CPC .............. G06F 16/24522; G06F 16/3329
See application file for complete search history.

(56) References Cited

U.S. PATENT DOCUMENTS 6,397,188 B1   5/2002   Iwasawa
7,376,632 B1   5/2008   Sadek et al.
(Continued)

FOREIGN PATENT DOCUMENTS

JP   2001337827   12/2001
JP   2010186237   8/2010

OTHER PUBLICATIONS

Pal, Aditya et al., "Question Routing to User Communities," In Proceedings of CIKM 2013, San Francisco, CA, Oct. 27-Nov. 1, 2013, pp. 2357-2362.
(Continued)

*Primary Examiner* — Austin Hicks
(74) *Attorney, Agent, or Firm* — F. Chau & Associates, LLC (57) ABSTRACT

A method for answering a natural-language user query includes receiving a query from a user by a central agent, parsing the query, and determining if an answer is known to the central agent as being within a local database. If the answer is known, the query is answered with a known natural-language answer using the local database. If not, artificial conversational entity (ACE) invocation is performed. The ACE invocation includes determining a topical field for the query, determining an ACE, of a plurality of ACEs, to send the query to, based on the topical field, and sending the query to the ACE. If the ACE is capable of answering, a natural-language answer is received from the ACE and presented to the user. If not, a natural-language answer is created using social knowledge and presented to the user. Social knowledge includes data crawled from subscriber-provided content of social media services.

20 Claims, 8 Drawing Sheets

(56) References Cited

U.S. PATENT DOCUMENTS

| | | | |
|---|---|---|---|
| 8,156,060 | B2 | 4/2012 | Borzestowski et al. |
| 8,595,297 | B2 | 11/2013 | Marcucci et al. |
| 9,172,747 | B2 * | 10/2015 | Walters .................. H04L 67/10 |
| 9,280,610 | B2 * | 3/2016 | Gruber ................ G06F 16/9535 |
| 2002/0069203 | A1 | 6/2002 | Dar et al. |
| 2002/0073162 | A1 | 6/2002 | McErlean |
| 2004/0034531 | A1 | 2/2004 | Chou et al. |
| 2009/0162824 | A1 | 6/2009 | Heck |
| 2011/0252011 | A1 | 10/2011 | Morris et al. |
| 2012/0253788 | A1 | 10/2012 | Heck et al. |
| 2014/0172883 | A1 | 6/2014 | Clark et al. |
| 2016/0063992 | A1 | 3/2016 | Selfridge |

OTHER PUBLICATIONS

Lasecki, Walter S., et al. "Chorus: A Crowd-Powered Conversational Assistant," In Proceedings of UIST 2013, St. Andrews, Scotland, Oct. 8-11, 2013. pp. 151-162.

Mahmud, Jalal, et al., "When Will You Answer This? Estimating Response Time in Twitter," Proceedings of ICWSM 2013, Boston, MA, Jul. 8-11, 2013, pp. 697-700.

Horowitz, Damon, et al., "The Anatomy of a Large Scale Social Search Engine", Proceedings of WWW 2010, Apr. 26-30, Raleigh, NC, USA, pp. 431-440.

Teevan, Jaime, et al,. "Factors Affecting Response Quantity, Quality and Speed for Questions Asked via Social Network Status Messages". In Proceedings of ICWSM 2011, Barcelona, Spain, pp. 630-633.

Adamic, Lada A., et al., Knowledge Sharing and Yahoo Answers: Everyone Knows Something. Proceedings of WWW 2008, Apr. 21-25, 2008 pp. 665-674.

Liu, Qiaoling, et al. "Predicting Web Searcher Satisfaction with Existing Community-Based Answers". Proceedings of SIGIR 2011.

Mamykina, Lena et al., "Design Lessons from the Fastest Q&A Site in the West." Proceedings of CHI 2011, May 7-12, 2011.

Morris, M.R., et al., "What Do People Ask Their Social Networks, and Why? A Survey Study of Status Message Q&A Behavior". Proceedings of CHI 2010, Apr. 10-15, 2010.

Morris, M.R., et al., "A Comparison of Information Seeking Using Search Engines and Social Networks." Proceedings of ICWSM 2010 pp. 291-294.

Paul, Sharoda A., et al., "Who is Authoritative? Understanding Reputation Mechanisms in Quora." Proceedings of Collective Intelligence 2012.

* cited by examiner

SYSTEM AND METHOD FOR MANAGING ARTIFICIAL CONVERSATIONAL ENTITIES ENHANCED BY SOCIAL KNOWLEDGE

TECHNICAL FIELD

Exemplary embodiments of the inventive concept relate to a system and method for managing and coordinating artificial conversational entities enhanced by social knowledge.

DISCUSSION OF RELATED ART

A chatbot is a computer program or software designed to engage in conversation with a user via textual or auditory means. Chatbots may be referred to as artificial conversational entities (ACE). In recent years, chatbot technology using artificial intelligence has been increasing in popularity. Given the prevalence of smartphones and mobile apps, the usage of chatbots in apps has also grown significantly. In addition to apps, other trends are growing as well, such as Messaging as a Platform (MaaP) and conversational interfaces (e.g., through voice conversation and recognition) that may take advantage of chatbots.

Chatbots may be plugged in and integrated into a system. However, the chatbots need to receive and send messages in a particular way that depends on the application programming interface (API) of the system, and there is limited support for building and improving the chatbots' behavior. Chatbots may also be specifically created with an intention-based setup (e.g., taking action based on specific needs of users) and they may reply to received intentions from users. Furthermore, service chatbots may be created with an intention-based setup and they may execute actions and reply in response to received intentions.

Chatbots may be configured to converse with users using natural dialogue and may provide information from different data sources such as a set of websites. In a natural dialogue system, multiple chatbots, which may be managed and hosted by different institutions, may be able to join in one conversation. However, these chatbots might not be coordinated and might not stay up to date (e.g., with the latest information from social media).

SUMMARY

According to an exemplary embodiment of the inventive concept, a method for answering a natural-language user query includes receiving a natural-language user query from a user by a central agent, parsing the natural-language user query, and determining if an answer to the parsed natural-language user query is known to the central agent as being within a local database. When it is determined that the answer to the parsed natural-language user query is known to the central agent as being within the local database, the parsed natural-language user query is answered in the form of a known natural-language answer, using the local database. When it is determined that the answer to the parsed natural-language user query is not known to the central agent as being within the local database, artificial conversational entity (ACE) invocation is performed. The ACE invocation includes determining a topical field for the parsed natural-language query, determining an ACE, of a plurality of available ACEs, to send the parsed natural-language query to, based on the determined topical field, and sending the parsed natural-language query to the determined ACE. When the determined ACE is capable of answering the parsed natural-language query, a natural-language answer to the parsed natural-language query is received from the determined ACE and presented to the user. When the determined ACE is not capable of answering the parsed natural-language query, a natural-language answer to the parsed natural-language query is created using social knowledge, and presented to the user. Social knowledge includes data that is crawled from subscriber-provided content of social media services.

According to an exemplary embodiment of the inventive concept, a system for answering a natural-language user query includes a central agent, a local database, a plurality of artificial conversational entities (ACE), and a messaging service, application, or artificial intelligence user assistance platform. The central agent is configured to receive a natural-language user query from a user and answer the received natural-language user query. The local database, associated with the central agent, is configured to provide the central agent with a limited set of natural-language answers. The plurality of ACEs is each configured to answer natural-language user queries of a particular topical field. The messaging service, application, or artificial intelligence user assistance platform is configured to provide communication between the user and the central agent and configured to provide communication between the central agent and the plurality of ACEs. The central agent is further configured to answer the received natural-language user query from the local database, from the plurality of ACEs, or from social knowledge including data that is crawled from subscriber-provided content of social media services.

According to an exemplary embodiment of the inventive concept, a computer system includes a processor and a non-transitory, tangible, program storage medium, readable by the computer system, embodying a program of instructions executable by the processor to perform method steps for answering a natural-language user query. The method includes receiving a natural-language user query from a user by a central agent and determining if an answer to the natural-language user query is known to the central agent as being within a local database. When it is determined that the answer to the natural-language user query is known to the central agent as being within the local database, the natural-language user query is answered in the form of a known natural-language answer, using the local database. When it is determined that the answer to the natural-language user query is not known to the central agent as being within the local database, artificial conversational entity (ACE) invocation is performed. The ACE invocation includes determining a topical field for the natural-language query, determining an ACE, of a plurality of available ACEs, to send the natural-language query to, based on the determined topical field, and sending the natural-language query to the determined ACE. When the determined ACE is capable of answering the natural-language query, a natural-language answer to the natural-language query is received from the determined ACE and presented to the user. When the determined ACE is not capable of answering the natural-language query, a natural-language answer to the natural-language query is created using social knowledge and presented to the user. Social knowledge includes data that is crawled from subscriber-provided content of social media services.

BRIEF DESCRIPTION OF THE DRAWINGS

The above and other features of the inventive concept will become more apparent by describing in detail exemplary embodiments thereof, with reference to the attached drawings.

DETAILED DESCRIPTION OF THE EMBODIMENTS

Chatbots may be configured to preemptively store question and answer (Q&A) pairs in a database. As a result, when a user asks a question that is sufficiently similar to a question of a stored Q&A pair, the chatbot may be able to provide an answer. Certain social media websites are configured with a question and answer structure, where a user may post a question and other users can answer the question at a later time. However, with these sites, users are unable to get answers immediately. Some chatbots may be configured to search these social media websites for Q&A pairs. However, they are not configured to also search hyperlinks posted on social media in real time to answer user queries. Some systems are able to match a user with a question to a real person (e.g., customer service representatives) who is able to answer the question. However, actual people might not always be available to answer questions, unlike chatbots.

Furthermore, in a natural dialogue system, one or more users may converse with one or more chatbots. As such, coordination and mediation of the dialogue is critical.

Exemplary embodiments of the inventive concept provide for a system and method for creating and managing coordinated multiple chatbots using natural dialogue systems enhanced by online social knowledge. The multiple chatbots may be separated by area of expertise. Chatbots may exploit or take advantage of the up to date social knowledge available through a plurality of social media services during a real time conversation. One or more chatbots may serve as a central agent with a mediator role. The system may have flexible and adaptive coordination rules that are managed autonomously or semi-autonomously. Accordingly, users may be able to engage in a natural language conversation with multiple chatbots to obtain accurate, up to date answers to their queries.

Exemplary embodiments of the inventive concept will be described more fully hereinafter with reference to the accompanying drawings. Like reference numerals may refer to like elements throughout the specification and drawings.

Figure 1:
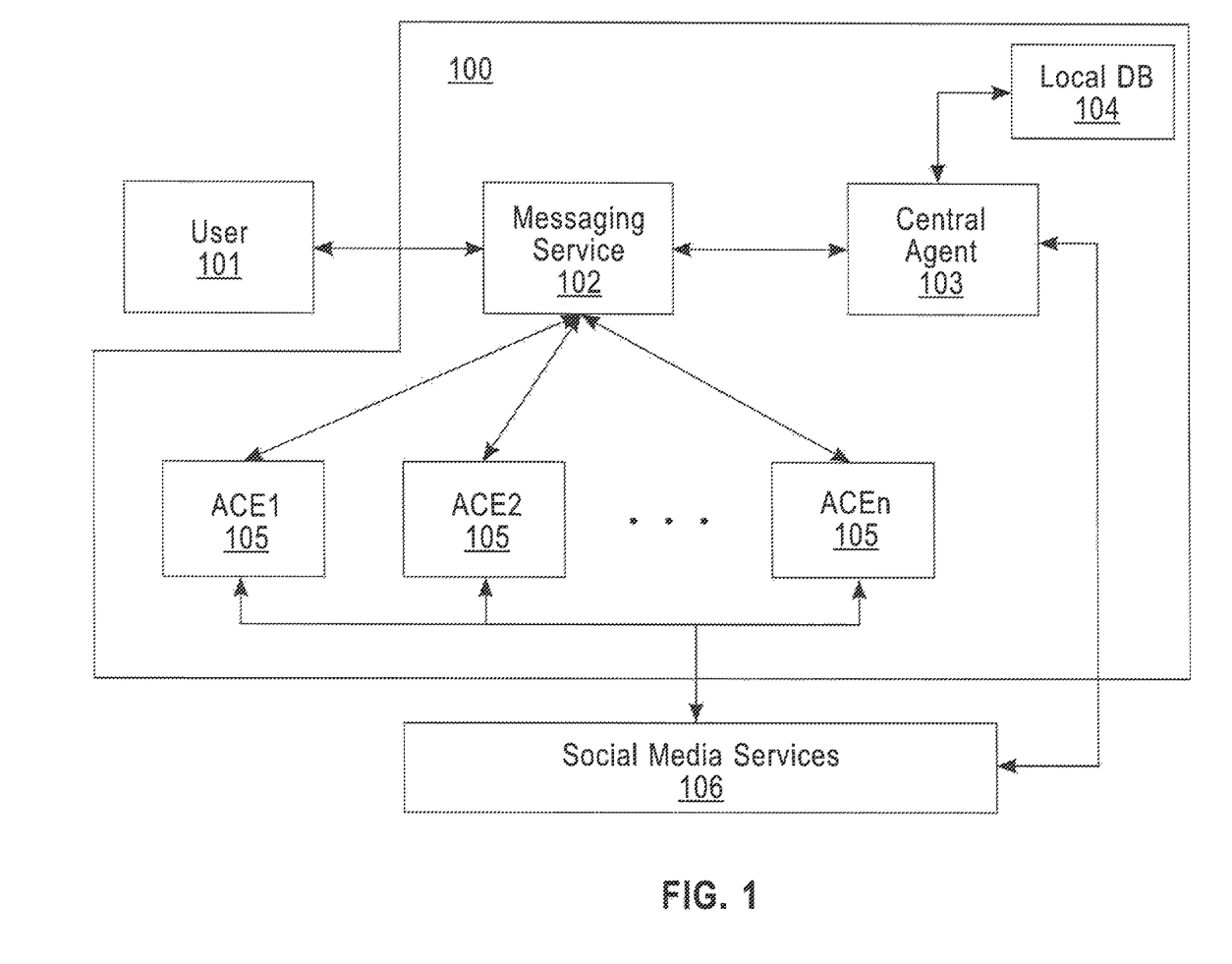
FIG. 1 illustrates a system for answering a natural-language user query according to an exemplary embodiment of the inventive concept.

FIG. 1 illustrates a system for answering a natural-language user query according to an exemplary embodiment of the inventive concept.

Referring to FIG. 1, a system 100 includes a messaging service 102, a central agent 103, a local database 104, and a plurality of artificial conversational entities (ACE) 105 (e.g., ACE1 to ACEn). A user 101 may be able to communicate with the system 100 through the message service 102. According to an exemplary embodiment of the inventive concept, multiple users may communicate with each other as well as with the system 100 through the message service 102.

The central agent 103 may be configured to receive a natural-language user query from the user 101 and answer the received natural-language user query. For example, a natural-language user query may be, "How's the weather today?" The central agent 103 may be configured to coordinate dialogue between the user 101 and the plurality of ACEs 105. For example, the central agent 103 may be able to determine what a user's message is about (e.g., intent, entities, subject matter), when a reply should be sent, who should reply to the message (e.g., the user, the ACEs), how the reply should be formulated (e.g., whether a response is sufficient, whether actions need to be taken), etc. Coordination of the natural-language dialogue may be aided through a multi-agent system (MAS), open MAS, predetermined rules or laws, etc. The local database 104 may be associated with the central agent 103 and may be configured to provide the central agent 103 with a limited set of natural-language answers.

The plurality of ACEs 105 may be each configured to answer natural-language user queries of a particular topical field or domain. For example, among several finance-based ACEs, each may handle a different topic, such as saving accounts, currency exchange, certificates of deposit, stocks, etc. Each of the plurality of ACEs 105 may be a stand-alone natural-language question answering application or service. An ACE may be, for example, an artificial intelligence chatbot that is capable of conversing with a user using natural language. Each ACE may be configured with additional functionalities, such as machine learning, deep learning, data mining, different languages, etc. The plurality of ACEs 105 may have different architectures, such as rule-based (e.g., pattern-action rules, mental model) or corpus-based (e.g., information retrieval, deep neural nets, hidden Markov model (HMM), partially observable Markov decision process (POMDP)).

The plurality of ACEs 105 may be configured to communicate and respond to different messages including task-oriented and/or performative messages, and may perform a corresponding action (e.g., as a Q&A pair). The plurality of ACEs 105 may each store a plurality of Q&A pairs to handle the different message types. Table 1 below shows a number of message types and example messages.

TABLE 1

| Message Type | Example Message |
| --- | --- |
| INFORM | "The door is open" |
| QUERY | "Is the door open?" |
| CALL FOR PROPOSAL (CFP) | "Can someone open the door?" |
| REQUEST | "Open the door" |
| AGREE | "OK, I will open the door" |
| REFUSE | "I will not open the door" |

TABLE 1-continued

| Message Type | Example Message |
|---|---|
| FAILURE | "I can not open the door" |
| PROPOSE | "I can open the door for X dollars" |
| SUBSCRIBE | "I would like to know when someone opens the door" |
| NOT-UNDERSTOOD | "Door? Which door?" |

As one example of a Q&A pair, a QUERY message would be paired with an answer. As another example, a REQUEST message would be paired with an answer as well as a task to be performed. For instance, the user 101 may send a REQUEST message to the central agent 103 to perform an investment simulation, e.g., "Give me an investment simulation for stock X over a period of two years." The central agent 103 may forward this to a corresponding ACE among the plurality of ACEs 105 to respond affirmatively and perform the task.

The central agent 103 and the plurality of ACEs 105 may be configured to converse naturally with the user 101 (e.g., a mixed-initiative natural dialogue system). In other words, any party may be able to initiate queries. For example, in addition to responding to natural-language user queries, the central agent 103 and/or the plurality of ACEs 105 may also ask the user 101 questions and respond based on the answers from the user 101.

The messaging service 102 may be configured to provide communication between the user 101 and the central agent 103 and configured to provide communication between the central agent 103 and the plurality of ACEs 105. The central agent 103 and each of the plurality of ACEs 105 may access the messaging service 102 using various application program interfaces (APIs). The messaging service 102 may be a text, voice, or video messaging service. The messaging service 102 may be any kind of messaging platform, such as those used for text messaging, instant messaging, voice messaging, etc. For example, the messaging service 102 may be a chat or messaging app or software on a smartphone or computer (e.g., IMESSAGE, GOOGLE HANGOUTS, IRC, WHATSAPP, SMS) or a voice-based communication platform (e.g., SKYPE).

According to an exemplary embodiment of the inventive concept, the message service 102 may instead be an application or artificial intelligence user assistance platform to facilitate communication between the components of the system 100. The artificial intelligence user assistance platform may be a voice-activated digital assistant, examples of which include MICROSOFT CORTANA, APPLE's SIRI, GOOGLE NOW, AMAZON ALEXA, etc.

The central agent 103 may be configured to answer the received natural-language user query from the local database 104 or the plurality of ACEs 105. Additionally, the central agent 103 and the plurality of ACEs 105 may be connected to social media services 106 (e.g., social media websites, applications, or services). The central agent 103 or the plurality of ACEs 105 may answer the received natural-language user query using social knowledge, for example, data that is crawled from subscriber-provided content of the social media services 106.

Each of the central agent 103, the plurality of ACEs 105, and the messaging service 102 may be hosted on at least one independent server. Each of the independent servers may be connected to the Internet, e.g., to connect to the social media services 106 and/or the user 101. Furthermore, each of the independent servers may be distributed across at least one computer system.

Figure 2:
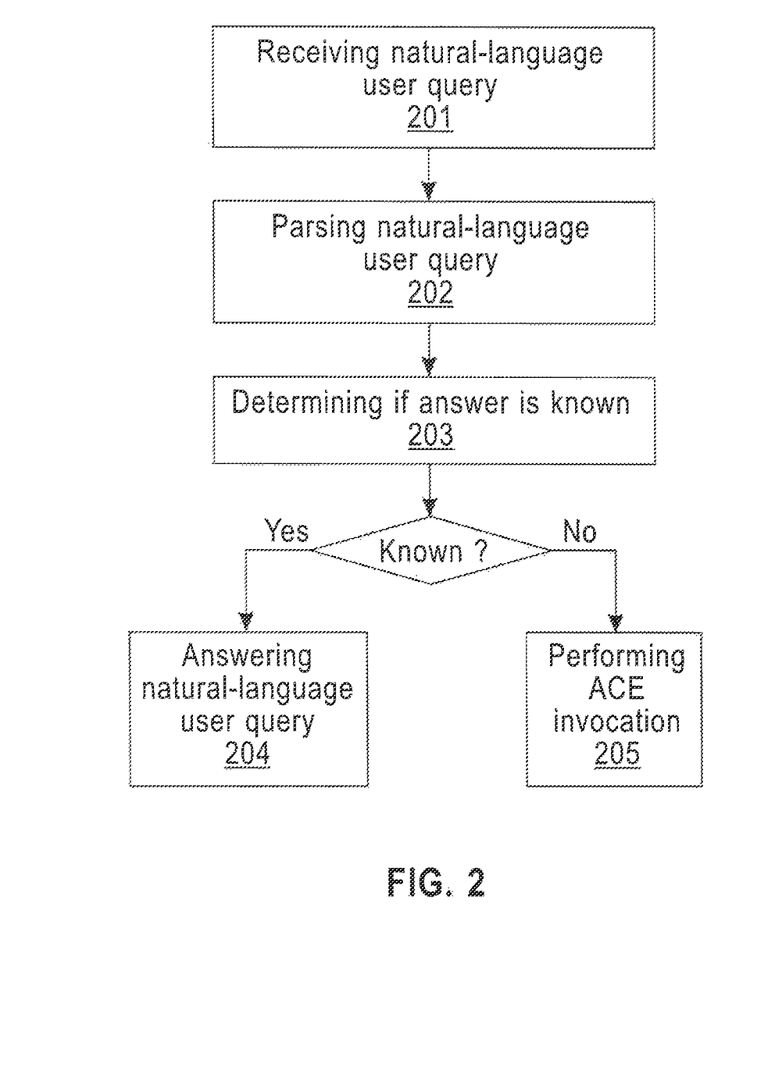
FIG. 2 is a flowchart illustrating a method for answering a natural-language user query according to an exemplary embodiment of the inventive concept.

FIG. 2 is a flowchart illustrating a method for answering a natural-language user query according to an exemplary embodiment of the inventive concept.

Referring to FIG. 2, a natural-language user query from a user (e.g., the user 101 of FIG. 1) may be received by a central agent (e.g., the central agent 103 of FIG. 1) (operation 201). The natural-language user query may be parsed (operation 202). For example, parsing may include spelling and grammar correction, interpretation of the query, and categorization by topic. It is determined whether an answer to the parsed natural-language user query is known to the central agent as being within a local database (e.g., the local database 104 of FIG. 1) (operation 203). For example, the local database may store a plurality of Q&A pairs and the parsed natural-language user query may be matched against the questions of the Q&A pairs to find similar questions. If a sufficiently similar question is found, the answer to the parsed natural-language user query is considered known.

If the answer to the parsed natural-language user query is known to the central agent as being within the local database, the parsed natural-language user query is answered using the local database (operation 204). The answer may be in natural language form.

If the answer to the parsed natural-language user query is not known to the central agent as being within the local database, artificial conversational entity (ACE) invocation may be performed (operation 205). The ACE invocation will be described below with reference to FIG. 3.

Figure 3:
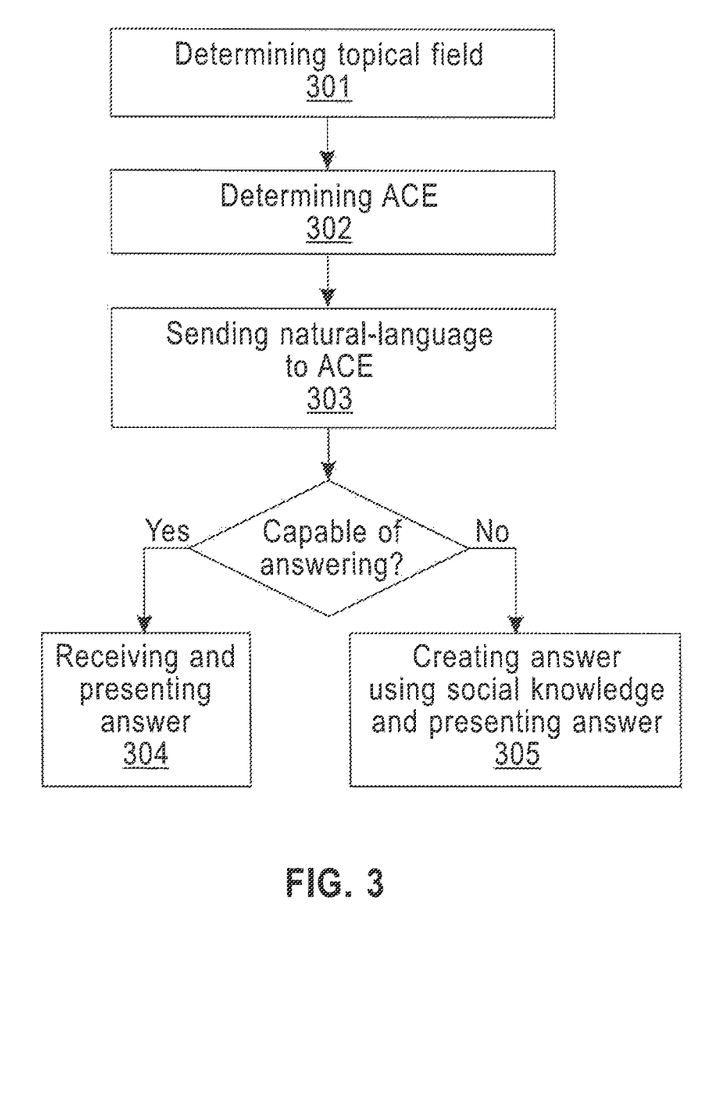
FIG. 3 is a flowchart illustrating operations related to invocation of an artificial conversational entity (ACE) according to an exemplary embodiment of the inventive concept.

FIG. 3 is a flowchart illustrating operations related to invocation of an artificial conversational entity (ACE) according to an exemplary embodiment of the inventive concept.

Referring to FIGS. 2 and 3 together, operation 205 of FIG. 2 may include operations 301 to 305 of FIG. 3.

Referring to FIG. 3, a topical field for the parsed natural-language query is determined (operation 301). The topical field may be determined using a keyword comparison scan. Based on the determined topical field, an ACE, among a plurality of available ACEs, is determined to send the parsed natural-language query to (operation 302). The plurality of available ACEs may correspond to the plurality of ACEs 105 of FIG. 1. The parsed natural-language query is sent to the determined ACE (operation 303).

If the determined ACE is capable of answering the parsed natural-language query, a natural-language answer to the parsed natural-language query is received from the determined ACE and presented to the user (operation 304).

If the determined ACE is not capable of answering the parsed natural-language query, a natural-language answer to the parsed natural-language query is created using social knowledge and presented to the user (operation 305). Social knowledge may include data that is crawled from subscriber-provided content of social media services (e.g., the social media services 106 of FIG. 1). For example, according to an exemplary embodiment of the inventive concept, social knowledge may be data gathered beforehand (e.g., from authoritative figures or sources on social media) in the form of Q&A pairs. Additionally, if this data is insufficient, the natural-language answer may be created by conducting a broader search of the social media services in real time to find a Q&A pair. A successful search may depend on positive feedback (e.g., "likes" or "upvotes") that exceed a predetermined threshold, and the answer may be accompanied by an indicator of confidence. An exemplary embodiment of this process will be explained in more detail below with reference to FIG. 6.

According to exemplary embodiments of the inventive concept, the created natural-language answer may be created by the central agent or at least one of the plurality of available ACEs.

As described above with respect to FIG. 1, the natural-language query may be sent from the user to the central agent along a messaging service (e.g., the messaging service 102 of FIG. 1), application, or artificial intelligence user assistance platform. Additionally, the known natural-language answer from the central agent, the received natural-language answer from the determined ACE, or the created natural-language answer may be sent from the central agent to the user along the messaging service, application, or artificial intelligence user assistance platform. Moreover, the parsed natural-language query may be sent from the central agent to the determined ACE along the messaging service, application, or artificial intelligence user assistance platform.

Referring to FIGS. 2 and 3, the method for answering a natural-language user query may be performed by a computer system. For example, the computer system may include a processor and a non-transitory, tangible, program storage medium. The program storage medium may be readable by the computer system and embody a program of instructions executable by the processor to perform the method for answering a natural-language user query. This will be described in detail below with reference to FIG. 9.

Figure 4:
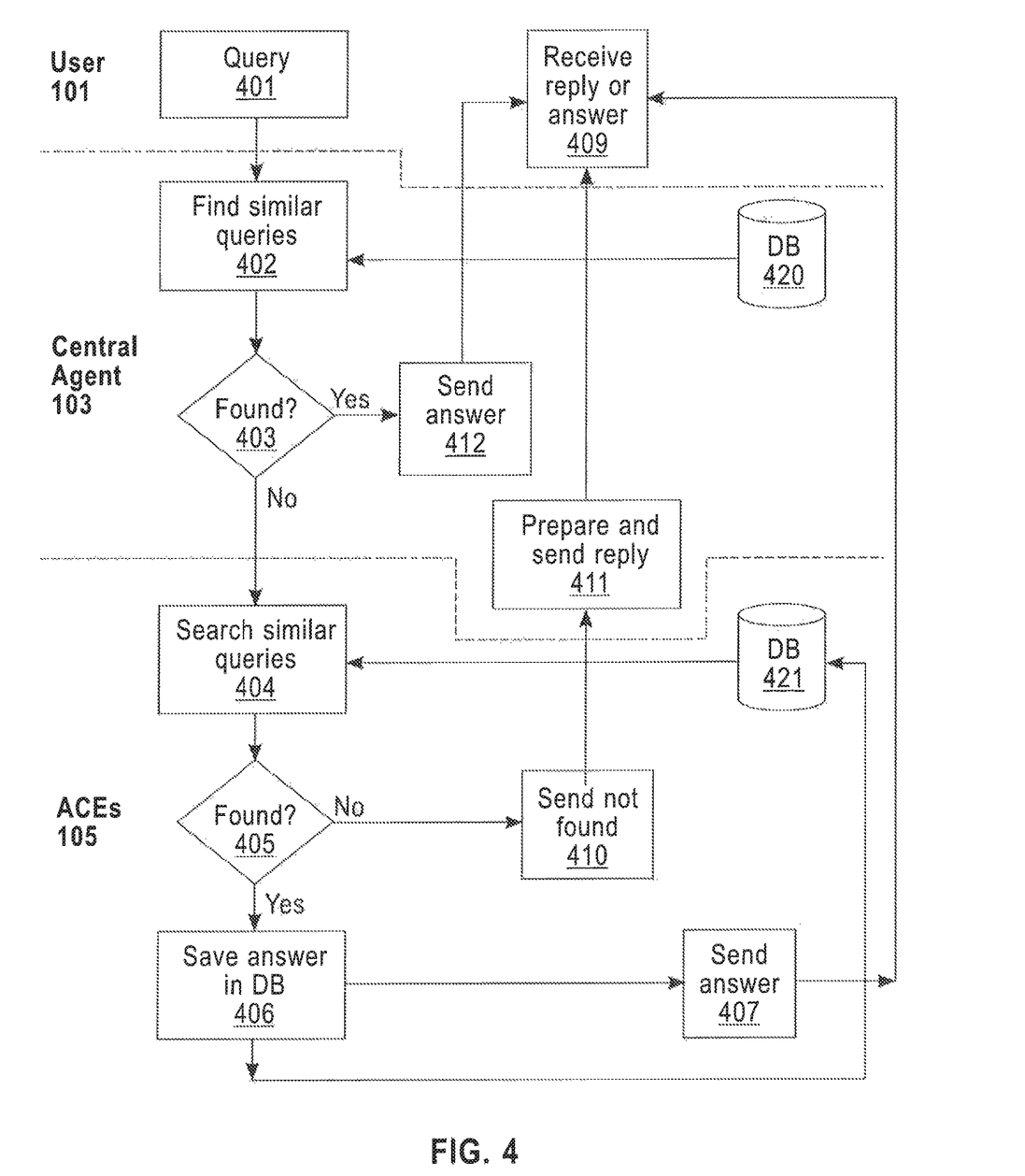
FIG. 4 is a flowchart illustrating a method for answering a natural-language user query according to an exemplary embodiment of the inventive concept.

FIG. 4 is a flowchart illustrating a method for answering a natural-language user query according to an exemplary embodiment of the inventive concept.

Referring to FIGS. 1 and 4 together, operations in the method may be divided among the user 101, the central agent 103, and the plurality of ACEs 105. The user 101 may ask a question, e.g., a natural-language query (operation 401). The central agent 103 may search for similar queries in a database 420 (e.g., the local database 104) (operation 402). The database 420 may be, for example, a relational database. It is determined whether similar queries are found such that an answer may be formulated (operation 403).

If similar queries are found, the answer is sent to the user 101 (operation 412), which will be described further below. If similar queries are not found, the plurality of ACEs 105 may search for similar queries within a database 421 (operation 404). The database 421 may be, for example, a NoSQL or non relational database. According to an exemplary embodiment of the inventive concept, each of the plurality of ACEs 105 may have its own database. It is determined whether similar queries are found by the plurality of ACEs such that an answer may be formulated (operation 405).

If similar queries are found, the answer is saved in the database 421 (operation 406) and the answer is sent to the user 101 (operation 407). If similar queries are not found, the ACEs 105 may send a notification to the central agent 103 that an answer was not found (operation 410), and the central agent 103 prepares and sends a reply to the user 101 (operation 411). For example, a FAILURE message may be sent, as described with reference to Table 1 above.

As described above, the user 101 may receive one of the answer from the central agent 103 (from operation 412), the answer from the ACEs 105 (from operation 407), or a negatory reply/failure message from the central agent 103 (from operation 411). In other words, the user 101 receives the reply or answer in response to the query (operation 409).

According to an exemplary embodiment of the inventive concept, the user 101, the central agent 103, and the ACEs 105 may be joined together in one chat instance or group as a multi-party dialogue. The central agent 103 may be able to invite one or more ACEs to the chat in response to the user's utterances, queries, responses, etc. The central agent 103 may manage the conversation and keep the conversation on topic. Additionally, the central agent 103 may have a degree of control and enforcement over what the ACEs 105 say in the chat (e.g., only permitting allowed messages).

Referring to FIGS. 1 and 4 together, as an illustrative example of a user interacting with a reactive ACE mediated by the central agent 103 according to an exemplary embodiment of the inventive concept, the user 101 may send a message, such as "Is it good to invest in the U.S. dollar today?", through the messaging service 102. The messaging service 102 may include an ACE proxy that updates dialogue context and preferences of the user 101 and forwards the message to a dialogue management system controlled by the central agent 103. The dialogue management system receives and processes the message, e.g., identifying the dialogue, parsing, detecting a speech act, detecting a question type, detecting language, detecting errors, enriching the message, etc. Parsing may be achieved through a grammatical parsing strategy by identifying dependencies among words through, for example, part-of-speech (POS) tagging (e.g., determining if words are verbs, adjectives, etc.), named entity recognition (NER) (e.g., determining persons and locations within sentences), etc. Based on the results, the central agent 103 may add or remove ACEs within the chat and update the dialogue or conversation (e.g., to notify that an ACE has been added).

The central agent 103 may identify the intention of the message and identify any necessary actions. The central agent 103 may then execute the action; in this case, the central agent 103 may add an ACE, among the plurality of ACEs 105, that specializes in currency (e.g., "@dollarBot") to the chat, and send a message, such as "@dollarBot, is it good to invest in the dollar today?" The @dollarBot ACE may respond accordingly, e.g., identifying the intention, identifying possible actions, and executing an action. Actions may include speech acts or messages constructed from templates. The @dollarBot ACE may search social knowledge collected in the database 421, rank the results, and retrieve the best result. For example, the @dollarBot ACE may send a reply, such as "Today is not a good day to invest in the dollar. You should wait a few days." The messaging service 102 may receive the reply and send it to the user 101.

According to an exemplary embodiment of the inventive concept, different parties in the chat may interact directly with one another. For example, the user 101 may choose to interact directly with one of the plurality of ACEs 105 (e.g., "@dollarBot") rather than the central agent 103 (e.g., "@mediator"). When the user 101 sends a message without specifying a name, the central agent 103 replies to the user 101. When the user 101 sends a message with "@dollarBot", the @dollarBot ACE replies. When the @dollarBot ACE sends a message with "@mediator", the central agent 103 replies. When the @dollarBot ACE sends a message without specifying a name, the user 101 may choose to continue the conversation or may end the conversation. For example, the user 101 may send a message, such as "Goodbye @dollarBot", and the @dollarBot ACE will leave the chat. According to an exemplary embodiment of the inventive concept, the central agent 103 may ask for permission from the user 101 before adding any of the plurality of ACEs 105 to the chat.

Figure 5:
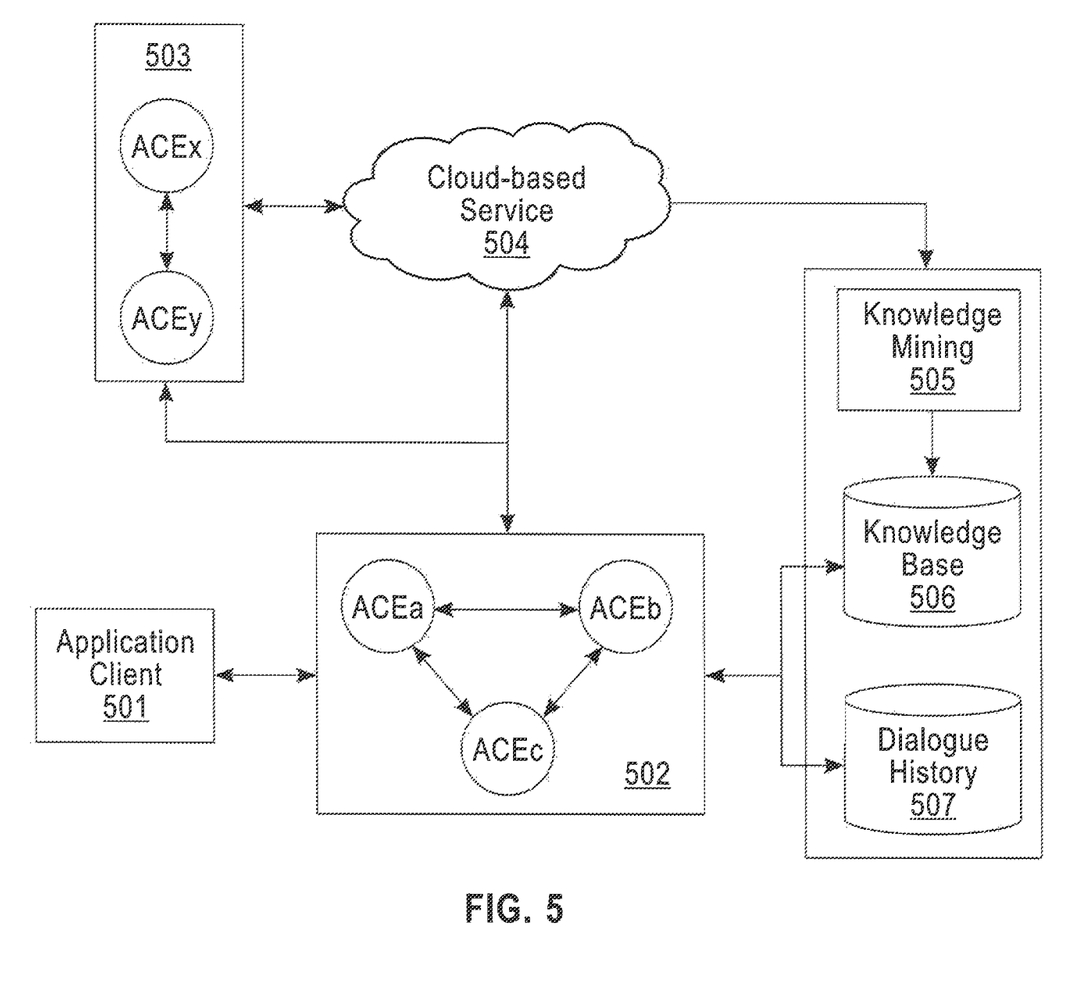
FIG. 5 illustrates a decentralized system for answering a natural-language user query with peer-to-peer ACEs connected to a backend cloud according to an exemplary embodiment of the inventive concept.

FIG. 5 illustrates a decentralized system for answering a natural-language user query with peer-to-peer ACEs connected to a backend cloud according to an exemplary embodiment of the inventive concept.

Referring to FIG. 5, the decentralized system may include an application client 501, a first plurality of ACEs 502 (ACEa to ACEc), a second plurality of ACEs 503 (ACEx to ACEy), a cloud-based service 504, a knowledge mining component 505, a knowledge base 506, and a dialogue history 507. The application client 501 may include the central agent 103 of FIG. 1. The first plurality of ACEs 502 and/or the second plurality of ACEs 503 may correspond to the plurality of ACEs 105 of FIG. 1. The first plurality of ACEs 502 and the second plurality of ACEs 503 may be connected with a peer-to-peer (P2P) architecture.

A user (e.g., the user 101 of FIG. 1) may interact with the application client 501 and submit natural-language queries to the application client 501. The application client 501 may be, for example, an app on a smartphone. The application client 501 may communicate the natural-language query to the first plurality of ACEs 501. According to an exemplary embodiment of the inventive concept, communication with the first plurality of ACEs 501 may be achieved through a multi-chatbot middleware.

When knowledge within the first plurality of ACEs 502 is insufficient to answer the natural-language query, the natural-language query may be forwarded to the second plurality of ACEs 503, which may be separately managed. The first plurality of ACEs 502 and the second plurality of ACEs 503 may be connected to the cloud-based service 504 to find an answer to the natural-language query. As described above, to answer the natural-language query, each of the first plurality of ACEs 502 and the second plurality of ACEs 503 may be configured to search for Q&A pairs gathered from social media services via the cloud-based service 504 and stored in the knowledge base 506. The first plurality of ACEs 502 and the second plurality of ACEs 503 may share the knowledge base 506. However, the inventive concept is not limited thereto and there may be any number of knowledge bases depending on the configuration.

Accordingly, the cloud-based service 504 may be connected to the internet, e.g., to connect to the social media services 106 of FIG. 1. The cloud-based service 504 may include crawlers configured to search social media services for social knowledge relevant to user queries (e.g., Q&A pairs). In addition to searching through posts on social network feeds, the crawlers may also conduct a deeper search, e.g., by searching forums, blog posts, frequently asked questions (FAQs), websites from hyperlinks posted on the social network feeds, etc. For example, experts may frequently discuss a given subject or topic on their blogs and post hyperlinks to their blogs on their social media accounts. These can then be crawled for data.

The crawlers in the cloud-based service 504 may be connected to the knowledge mining component 505. The knowledge mining component 505 may be software configured to collect data (e.g., social knowledge) from the cloud-based service 504 in real time and filter relevant data to be stored in the knowledge base 506. The process of gathering data from social media services will be described in detail below with reference to FIG. 6.

The knowledge base 506 may be connected to at least the first plurality of ACEs 502 and used to answer user queries. Additionally, a log of past conversations with users may be stored in the dialogue history 507, which also may be used to answer user queries. The knowledge base 506 and the dialogue history 507 may be one database or separate databases. According to an exemplary embodiment of the inventive concept, the knowledge mining component 505, the knowledge base 506, and the dialogue history 507 may be hosted on a separate server that is offline, e.g., accessible by the first plurality of ACEs 502 without an internet connection.

According to an exemplary embodiment of the inventive concept, the first plurality of ACEs 502 and the second plurality of ACEs 503 may be configured to answer a variety of questions from users. In other words, in addition to responding to simple, factual queries ("What is the price of stock XT") and task-oriented queries ("What is the projected performance of stock XT"), as described above with reference to FIG. 1, they may be able to respond to opinion-based queries (e.g., "Should I sell stock XT"), by relying on up to date social knowledge.

According to an exemplary embodiment of the inventive concept, components of the decentralized system may communicate with one another asynchronously and in real time.

Although the first plurality of ACEs 502 includes three ACEs in FIG. 5, the inventive concept is not limited thereto and the first plurality of ACEs 502 may have any number of ACEs. Although the second plurality of ACEs 503 includes two ACEs in FIG. 5, the inventive concept is not limited thereto and the second plurality of ACEs 503 may have any number of ACEs. ACEs may be added or removed from the decentralized system as needed. In other words, the decentralized system is scalable.

Figure 6:
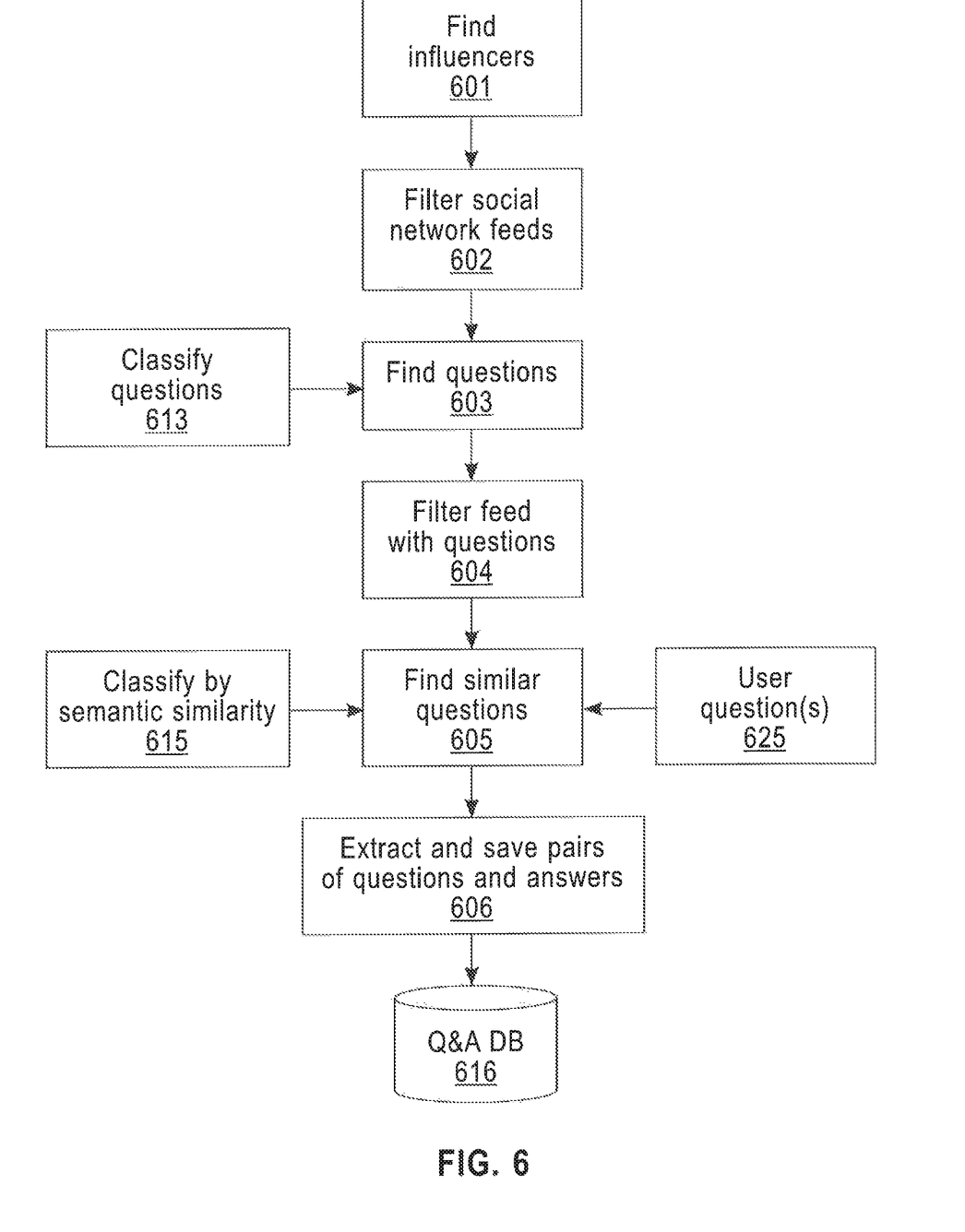
FIG. 6 is a flowchart illustrating operations to populate a question and answer database using social knowledge according to an exemplary embodiment of the inventive concept.

FIG. 6 is a flowchart illustrating operations to populate a question and answer database using social knowledge according to an exemplary embodiment of the inventive concept.

Referring to FIG. 6, a question and answer (Q&A) database 616 (e.g., a Q&A corpus) may correspond to the knowledge base 506 of FIG. 5. The operations to populate the Q&A database 616 will be described below. These operations may be implemented by the knowledge mining component 505 of FIG. 5.

Influencers may be found in social media services (e.g., the social media services 106 of FIG. 1) (operation 601). Influencers may be, for example, experts in different topical fields or online personalities with large numbers of followers, with social media accounts. Social network feeds in the social media services may be filtered based on the influencers found (operation 602). Within these social network feeds, questions that have been answered by the influencers may be found (operation 603). The questions may be classified or categorized such as by topical field, date, accuracy (e.g., based on feedback or similar answers by other influencers), etc. (operation 613). For example, accuracy may be partially gauged by user response, such as the number of "likes" (indicating positive feedback). The social network feeds may be further filtered based on the questions (operation 604).

Users may submit questions or queries (for example, as described with reference to FIG. 2) (operation 625). User-submitted questions may be matched against the filtered social network feeds to find similar questions (operation 605). To find similar questions, the questions may be classified by semantic similarity (operation 615). For example, only questions with a semantic similarity over a predetermined threshold may be retained.

After the similar questions (along with their respective answers) are found, the pairs of questions and answers may be extracted and saved (operation 606) in the Q&A database 616. The Q&A database 616 may then be used to answer the natural-language queries from users. Through the above-described process, ACEs may be able to have the most up to date information gleaned from social media services.

Figure 7:
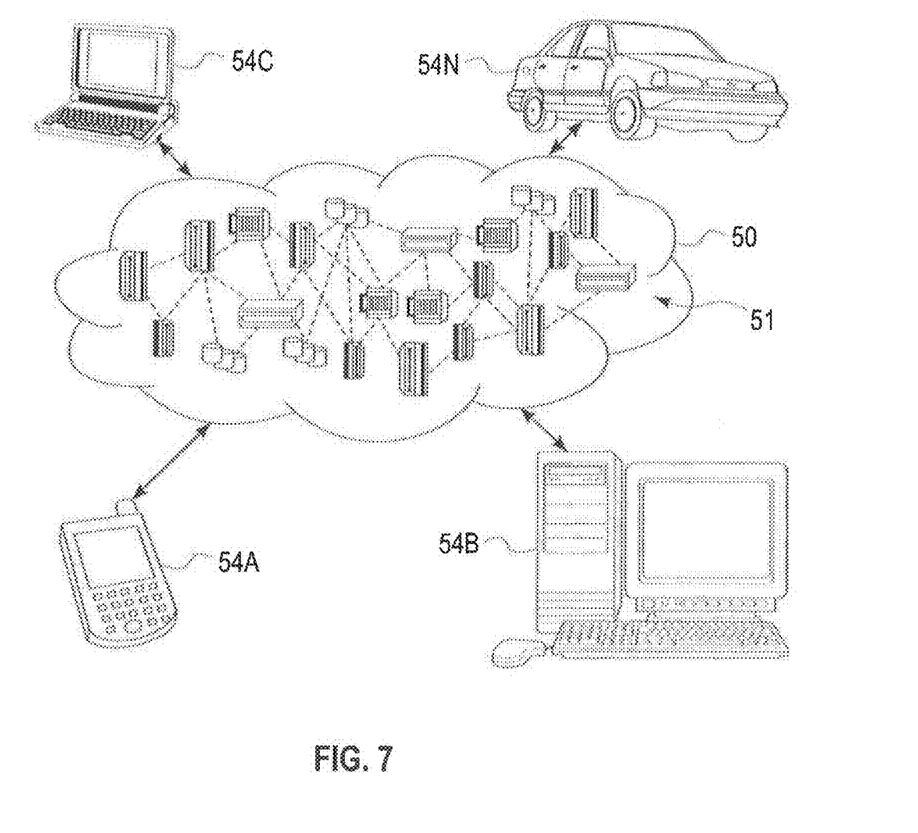
FIG. 7 depicts a cloud computing environment according to an exemplary embodiment of the inventive concept.
Figure 8:
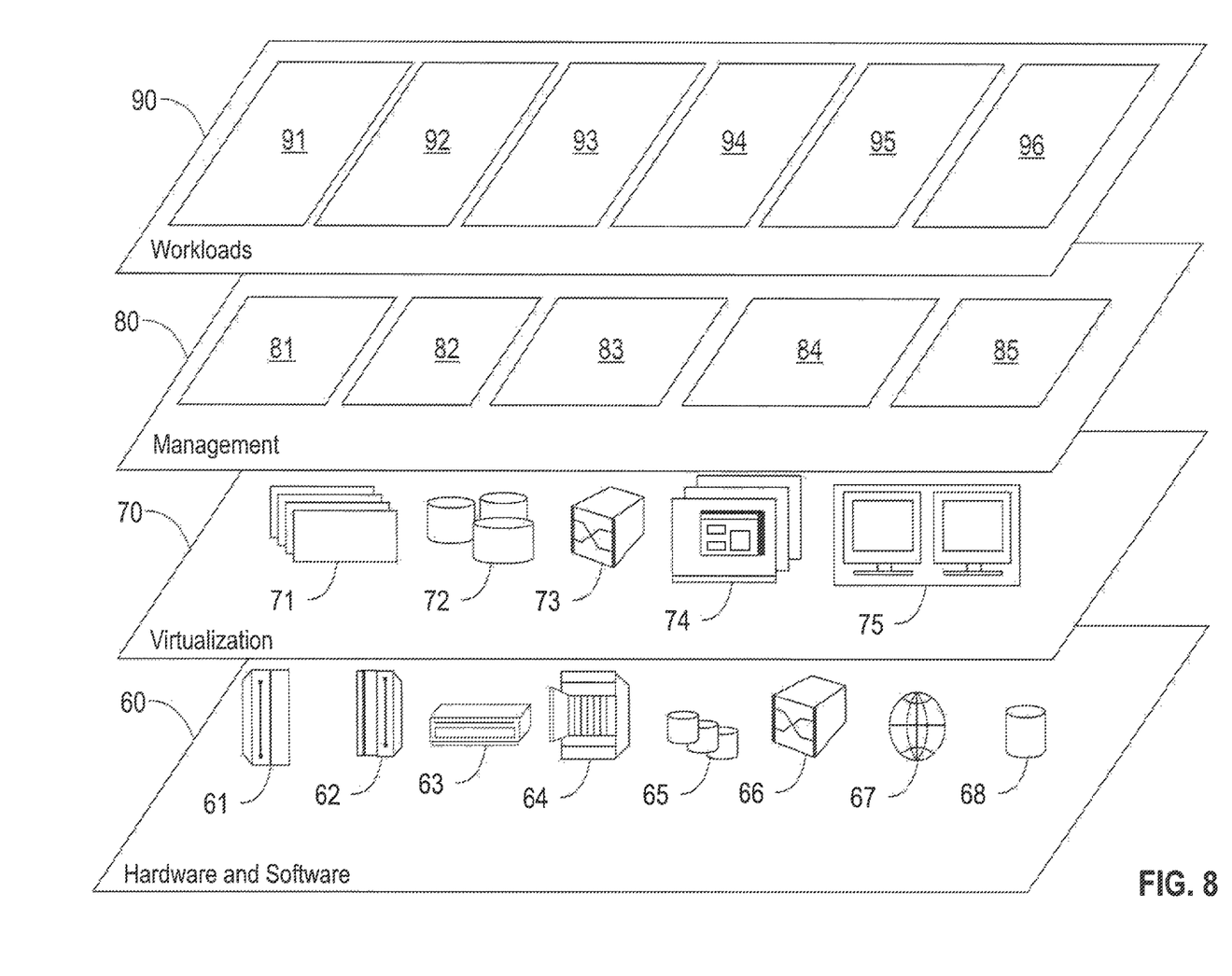
FIG. 8 depicts abstraction model layers according to an exemplary embodiment of the inventive concept.

FIG. 7 depicts a cloud computing environment according to an exemplary embodiment of the inventive concept. FIG. 8 depicts abstraction model layers according to an exemplary embodiment of the inventive concept.

It is understood in advance that although this disclosure includes a detailed description on cloud computing, implementation of the teachings recited herein are not limited to a cloud computing environment. Rather, embodiments of the inventive concept are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, illustrative cloud computing environment 50 is depicted. As shown, cloud computing environment 50 comprises one or more cloud computing nodes 51 with which local computing devices used by cloud consumers, such as, for example, personal digital assistant (PDA) or cellular telephone 54A, desktop computer 54B, laptop computer 54C, and/or automobile computer system 54N may communicate. Nodes 51 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 51 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and an ACE 96 (e.g., corresponding to the plurality of ACEs 105 of FIG. 1).

With respect to the system and method for answering a natural-language user query as described above with reference to FIGS. 1 to 6, they may be configured across the plurality of layers of FIG. 8 within the cloud computing environment 50 of FIG. 7. For example, the plurality of ACEs 105 of FIG. 1 may configured at the workloads layer 90, as described above, or at the virtualization layer 70. The central agent 103 of FIG. 1 may be configured at any one of the hardware and software layer 60, the virtualization layer 70, the management layer 80, or the workloads layer 90. The messaging service 102 of FIG. 1 may be configured at the workloads layer 90.

Figure 9:
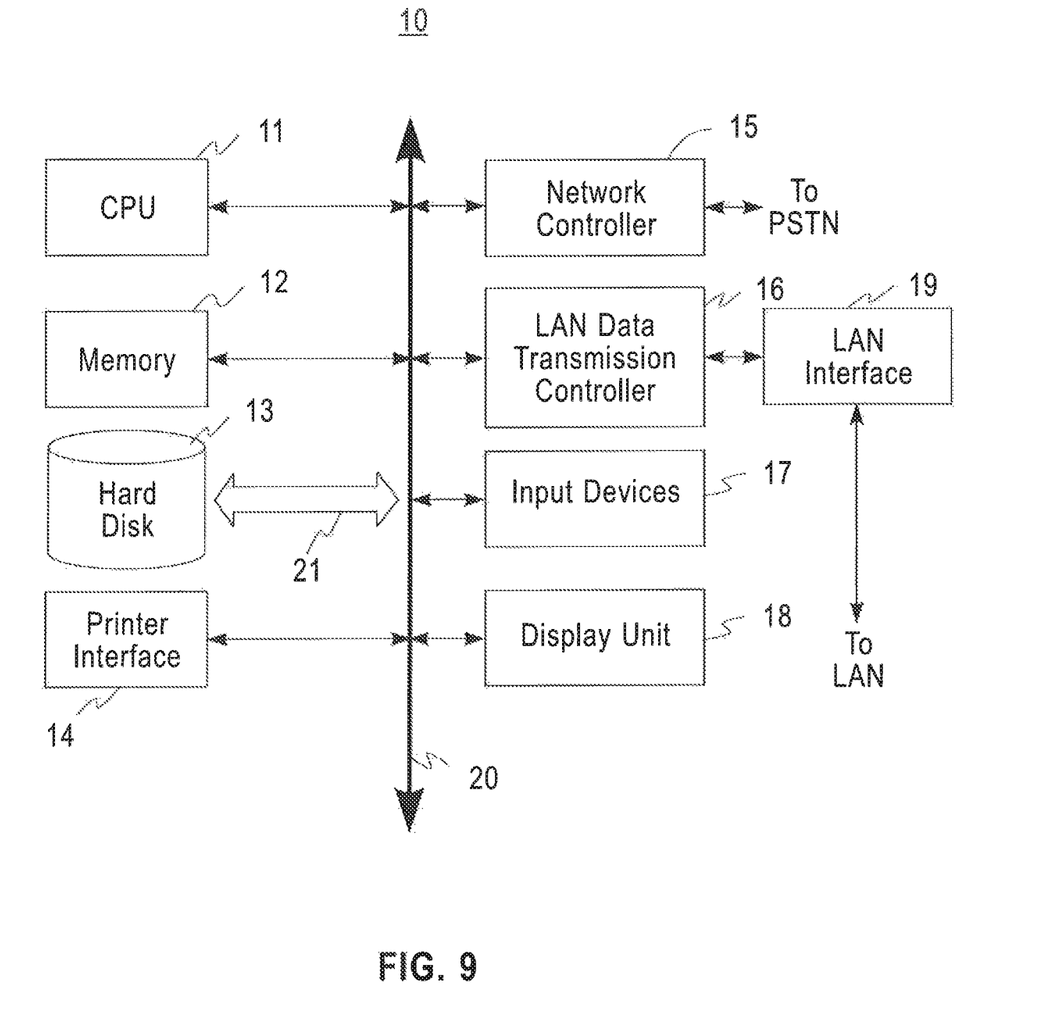
FIG. 9 illustrates an example of a computer system capable of implementing the methods according to an exemplary embodiment of the inventive concept.

FIG. 9 illustrates an example of a computer system capable of implementing the methods according to exemplary embodiments of the inventive concept. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 10 may include, for example, a central processing unit (CPU) 11, random access memory (RAM) 12, a printer interface 14, a network controller 15, a local area network (LAN) data transmission controller 16, a display unit 18, a LAN interface 19, an internal bus 20, and one or more input devices 17, for example, a keyboard, mouse etc. As shown, the system 10 may be connected to a data storage device, for example, a hard disk, 13 via a link 21.

As an example, the system 10 of FIG. 9 may be configured to perform the method described with reference to FIGS. 2 and 3.

Moreover, the inventive concept may be a system, a method, and/or a computer program product at any possible technical detail level of integration. The computer program product may include a computer readable storage medium (or media) having computer readable program instructions thereon for causing a processor to carry out aspects of the inventive concept.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the inventive concept may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the inventive concept.

Aspects of the inventive concept are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. See, e.g., FIGS. 2-4 and 6.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the inventive concept. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the inventive concept has been shown and described with reference to exemplary embodiments thereof, it will be understood by those of ordinary skill in the art that various changes in form and detail may be made therein without departing from the spirit and scope of the inventive concept as defined by the following claims.

What is claimed is:

1. A method for answering a natural-language user query, comprising:
    receiving a natural-language user query from a user by a central agent;
    parsing the natural-language user query;
    determining if an answer to the parsed natural-language user query is known to the central agent as being within a local database;
    answering the parsed natural-language user query, in the form of a known natural-language answer, using the local database, when it is determined that the answer to the parsed natural-language user query is known to the central agent as being within the local database;
    when it is determined that the answer to the parsed natural-language user query is not known to the central agent as being within the local database, artificial conversational entity (ACE) invocation is performed, the ACE invocation comprising:
        determining a topical field for the parsed natural-language query;
        determining an ACE, of a plurality of available ACEs, to send the parsed natural-language query to, based on the determined topical field;
        sending the parsed natural-language query to the determined ACE; and
        receiving a natural-language answer to the parsed natural-language query from the determined ACE, and presenting the received natural-language answer to the user when the determined ACE is capable of answering the parsed natural-language query; and
        creating a natural-language answer to the parsed natural-language query using social knowledge, and presenting the created natural-language answer to the user when the determined ACE is not capable of answering the parsed natural-language query,
    wherein social knowledge includes data that is crawled from social media services, and
    wherein the data that is crawled from the social media services includes data provided by an influencer having followers exceeding a predetermined number or data having positive feedback exceeding a predetermined threshold.

2. The method of claim 1, wherein the natural-language query is sent from the user and transmitted to the central agent along a messaging service, application, or artificial intelligence user assistance platform and the known natural-language answer, the received natural-language answer, or the created natural-language answer is sent from the central agent to the user along the messaging service, application, or artificial intelligence user assistance platform.

3. The method of claim 2, wherein the messaging service, application, or artificial intelligence user assistance platform is a text, voice, or video messaging service.

4. The method of claim 2, wherein the messaging service, application, or artificial intelligence user assistance platform is a voice-based communication platform.

5. The method of claim 1, wherein each of the plurality of available ACEs is a stand-alone natural-language question answering application or service.

6. The method of claim 1, wherein the topical field for the parsed natural-language query is determined using a keyword comparison scan.

7. The method of claim 1, wherein the parsed natural-language query is sent to the determined ACE along a messaging service, application, or artificial intelligence user assistance platform.

8. The method of claim 1, wherein the social media services include a plurality of social media websites, applications, or services.

9. The method of claim 1, wherein the created natural-language answer is created by the central agent.

10. A system for answering a natural-language user query, comprising:
   a central agent configured to receive a natural-language user query from a user and answer the received natural-language user query;
   a local database, associated with the central agent, configured to provide the central agent with a limited set of natural-language answers;
   a plurality of artificial conversational entities (ACE), each configured to answer natural-language user queries of a particular topical field; and
   a messaging service, application, or artificial intelligence user assistance platform configured to provide communication between the user and the central agent and configured to provide communication between the central agent and the plurality of ACEs,
   wherein the central agent is further configured to answer the received natural-language user query from the local database, from the plurality of ACEs, or from social knowledge including data that is crawled from social media services,
   wherein the number of the plurality of ACEs is greater than one,
   wherein the central agent is further configured to join the user and the plurality of ACEs in one chat instance, and
   wherein the central agent, the local database, the plurality of ACEs, and the messaging service application, or artificial intelligence user assistance platform are embodied in one or more computer systems.

11. The system of claim 10, wherein the central agent and each of the plurality of ACEs access the messaging service, application, or artificial intelligence user assistance platform using various application program interfaces (APIs).

12. The system of claim 10, wherein the messaging service, application, or artificial intelligence user assistance platform is a text, voice, or video messaging service.

13. The system of claim 10, wherein the messaging service, application, or artificial intelligence user assistance platform is a voice-based communication platform.

14. The system of claim 10, wherein each of the plurality of ACEs is a stand-alone natural-language question answering application or service.

15. The system of claim 10, wherein the social media services include a plurality of social media websites, applications, or services.

16. The system of claim 10, wherein the central agent, each of the plurality of ACEs, and the messaging service, application, or artificial intelligence user assistance platform is hosted on at least one independent server and each of the independent servers is connected to the Internet.

17. A computer system comprising:
   a processor; and
   a non-transitory, tangible, program storage medium, readable by the computer system, embodying a program of instructions executable by the processor to perform method steps for answering a natural-language user query, the method comprising:
   receiving a natural-language user query from a user by a central agent;
   determining if an answer to the natural-language user query is known to the central agent as being within a local database;
   answering the natural-language user query, in the form of a known natural-language answer, using the local database, when it is determined that the answer to the natural-language user query is known to the central agent as being within the local database;
   when it is determined that the answer to the natural-language user query is not known to the central agent as being within the local database, artificial conversational entity (ACE) invocation is performed, the ACE invocation comprising:
      determining a topical field for the natural-language query;
      determining an ACE, of a plurality of available ACEs, to send the natural-language query to, based on the determined topical field;
      sending the natural-language query to the determined ACE; and
      receiving a natural-language answer to the natural-language query from the determined ACE, and presenting the received natural-language answer to the user when the determined ACE is capable of answering the natural-language query; and
      creating a natural-language answer to the natural-language query using social knowledge, and presenting the created natural-language answer to the user when the determined ACE is not capable of answering the natural-language query,
   wherein social knowledge includes data that is crawled from social media services, and
   wherein the data that is crawled from the social media services includes data provided by an influence having followers exceeding a predetermined number or data having positive feedback exceeding a predetermined threshold.

18. The computer system of claim 17, wherein the natural-language query is sent from the user and transmitted to the central agent along a messaging service, application, or artificial intelligence user assistance platform and the known natural-language answer, the received natural-language answer, or the created natural-language answer is sent from the central agent to the user along the messaging service, application, or artificial intelligence user assistance platform.

19. The computer system of claim 17, wherein each of the plurality of available ACEs is a stand-alone natural-language question answering application or service.

20. The computer system of claim 17, wherein the created natural-language answer is created by the central agent.

* * * * *